United States Patent [19]
Tang et al.

[11] Patent Number: 5,853,487
[45] Date of Patent: Dec. 29, 1998

[54] PROCESS FOR PRODUCING LOW DE STARCH HYDROLYSATES BY NANOFILTRATION FRACTIONATION AND BLENDING OF RESULTANT PRODUCTS, PREFERABLY IN LIQUID FORM, WITH OTHER CARBOHYDRATES

[75] Inventors: Dan Tang, Quincy; Liuming Zhou, Hamilton; Robert Gerhardt, Sutter, all of Ill.

[73] Assignee: Roquette Freres, France

[21] Appl. No.: 66,651

[22] Filed: Apr. 27, 1998

[51] Int. Cl.$^6$ .................................................. C08B 31/00
[52] U.S. Cl. ........................... 127/32; 127/71; 106/215.5; 426/590; 426/661
[58] Field of Search .................... 127/32, 71; 106/215.5; 426/590, 661

[56] References Cited

U.S. PATENT DOCUMENTS

| | | |
|---|---|---|
| Re. 30,880 | 3/1982 | Armbruster . |
| 3,756,853 | 9/1973 | Meyer et al. . |
| 3,974,032 | 8/1976 | Harjes et al. . |
| 3,974,033 | 8/1976 | Harjes et al. . |
| 3,974,034 | 8/1976 | Horn et al. . |
| 4,154,623 | 5/1979 | Schwengers et al. ..................... 127/39 |
| 4,298,400 | 11/1981 | Armbruster . |
| 4,761,186 | 8/1988 | Schara et al. .............................. 127/71 |
| 4,840,807 | 6/1989 | Yoshlda et al. . |
| 5,194,094 | 3/1993 | Ammeraal et al. ........................ 127/69 |
| 5,612,202 | 3/1997 | Brumm . |

FOREIGN PATENT DOCUMENTS

| | | | |
|---|---|---|---|
| 0452238 | 10/1991 | European Pat. Off. .......... | C07H 3/02 |

OTHER PUBLICATIONS

CA 126:158987, Cartier et al, "Membranes technology in the sugar industry", 1996.

Kearsley, et al. "Reverse Osmosis of Glucose Syrups", *Dic Starke* 28, (Jan. 1976), Nr 4, pp. 138–144.

Birch, et al., "The Fractionation of Glucos Syrups by Reverse Osmosis", (Apr. 22–26, 1974) pp. 220–224.

R.D. Waniska et al., "Comparison of Methods for separating Oligosaccharides: Ultrafiltration . . . ", Journal of Food Science, vol. 45 1980,No Month avail. pp. 1260–1284.

R.J. peterson, et al., "Thin film Composite Reverse Osmosis Membranes", Handbook of Industrial Membran *Technology*, pp. 321–327. no date avail.

L.P. Raman, "Consider Nanofiltration for Membrane Separations", *Chemical Engineering*Progress (Mar. 1994) pp.68–74.

H.R. Sloan, et al, "Large Scale Production of Glucose Oligomers and Polymers for Physiological Studies in Humans", *Preparative Biochemistry*, 1954 (4), (1985) no month avail. pp. 259–279.

*Primary Examiner*—David Brunsman
*Attorney, Agent, or Firm*—Henderson & Sturm

[57] ABSTRACT

A process for producing a substantially non-retrograding starch hydrolysate, involves fractionating a starch hydrolysate comprising a DE greater than about 21 using a nanofiltration membrane, having a molecular weight cut-off of less than about 4,000 daltons, under nanofiltration conditions effective to result in a low DE starch hydrolysate fraction comprising a DE of less than about 25.

A process for producing a substantially non-retrograding, low DE starch hydrolysate blend involves combining the product produced by the process of the present invention with a carbohydrate in a predetermined blending ratio to result in a low DE starch hydrolysate blend.

A process for hydrogenating a low DE starch hydrolysate fraction produced by the process of the present invention to result in an hydrogenated low DE starch hydrolysate fraction.

20 Claims, 1 Drawing Sheet

PROCESS FOR PRODUCING LOW DE STARCH HYDROLYSATES BY NANOFILTRATION FRACTIONATION AND BLENDING OF RESULTANT PRODUCTS, PREFERABLY IN LIQUID FORM, WITH OTHER CARBOHYDRATES

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention is directed to producing substantially non-retrograding, low DE starch hydrolysates, which involves fractionating a starch hydrolysate comprising a DE greater than about 21 using a nanofiltration membrane under nanofiltration conditions effective to result in low DE starch hydrolysate fraction comprising a DE of less than about 25; resultant substantially non-retrograding low DE starch hydrolysate products; and blends of such low DE starch hydrolysates with other carbohydrates.

2. Description of the Related Art

Maltodextrins, a low DE starch hydrolysate, with a dextrose equivalent (DE) of not more than about 20, i.e., 4 to 20, have bland taste, low sweetness, and low hygroscopicity. Such products are useful as bases for the preparation of food items as well as for bodying agents and as additives having non-sweet, water-holding, non-hygroscopic characteristics. Other applications include their use as a carrier for synthetic sweeteners, as spray drying adjunct, as bulking, bodying or dispersing agents, as moisture holding agents, and as energy source in sports drinks.

Most commercially available maltodextrins in the world market produced by known technology are in the solid form or crystalline form due to retrogradation or haze formation and microbial instability in liquid form. However, there is a demand for a maltodextrin in its liquid form which exhibits extreme clarity, low viscosity, and will not develop retrogradation upon storage at room temperature.

It is known that starch hydrolysates at DE of above 25 will not retrograde, and that starch hydrolysates at DE below 20, e.g., maltodextrins, are prone to retrogradation upon standing.

There have been low DE liquid maltodextrins produced using conventional processes, such as enzyme conversion, chromatographic fractionation and membrane fractionation. However, the products produced suffered disadvantages including instability in liquid form or high viscosity.

U.S. Pat. No. 3,974,032 is directed to a haze resistant low DE liquid starch hydrolysate which has its weight average molecular weight to its number average molecular weight ratio less than about 20, and has less than about 20% by weight, dry basis, of starch oligosaccharides having a degree of polymerization greater than about 200. The low DE starch hydrolysate was prepared by enzymatically hydrolyzing starch dextrins having a degree of branching of at least about 7. As disclosed, the resultant starch hydrolysate comprises 20% of $DP200^+$.

U.S. Pat. Nos. 3,974,033 and 3,974,034 disclose methods to produce a low DE maltodextrin and improve stability by enzymatic hydrolysis of oxidized starch. The maltodextrin is characterized as being haze-free for long period of time at high solids concentration. The maltodextrin is prepared by first liquefying a highly oxidized starch with acid or enzyme to a DE not substantially above about 7; and, in a subsequent step, converting the oxidized and liquefied starch with a bacterial alpha-amylase enzyme preparation to achieve a maltodextrin product having a DE not substantially above about 20.

U.S. Pat. No. 4,298,400 discloses another enzyme hydrolysis method to produce non-haze low DE liquid starch hydrolysates. The product, prepared by two step hydrolysis both using bacterial alpha amylase, has a descriptive ratio higher than 2.0, and, therefore, exhibits non-haze property.

U.S. Pat. No. Re. 30,880 discloses a similar product and a similar process except that the first step hydrolysis was accomplished by acid instead of enzyme hydrolysate.

U.S. Pat. No. 4,840,807 discloses a fractionation method to produce liquid low DE branched maltodextrins. The process comprises the steps of reacting alpha-amylase with starch to produce a starch hydrolysate in the DE range of 10 to 35, and then contacting the resulting saccharified solution with a gel-type filter agent, thereby selectively fractionating the branched dextrin and linear oligo-saccharides. The gel-type filtering agent is an ion exchange resin and the fractionation system is a simulated moving bed. The resulted branched oligosaccharides has a mean molecular weight of from about 800 and to about 16,000 with a corresponding DE from about 20 to about 1.

Membrane separation is known to fractionate polysaccharides of sugars. Waniska et al. (Journal of Food Science, Vol. 45 (1980), 1259) discloses the fractionating ability of three ultra filtration (UF) membranes compared with gel permeation and chromatography for separating oligosaccharides (DP5–20) from lower molecular sugar. Birch et al. (Die Starke 26. Jahrg. 1974/Nr. 7, 220) discloses the fractionation of glucose syrups by reverse osmosis (RO) which offers a means for the manufacture of several new types of syrup, and which enables entire groups of sugars to be eliminated under selected conditions. Products in the range 43–80 DE or 15–43 DE can be obtained using suitable combinations of different membranes. Kearsley et al. (Die Starke 28. Jahrg. 1976/Nr. 4, 138) discloses the reverse osmosis (RO) of glucose syrups and ultra filtration (UF) operations to isolate specific groups of sugars, high or low molecular weight or both, from the syrup. Sloan et al. (Preparative Biochemistry, 15(4), 1985, 259–279) discloses the molecular filtration of ultra filtration (UF) membranes to concentrate oligosaccharides with degrees of polymerization above 10 from corn starch hydrolysate. It is not believed that any of these processes has been used to make a non-retrograded maltodextrin having low viscosity.

U.S. Pat. No. 3,756,853 (1973) discloses a reverse osmosis (RO) membrane process for making non-hazing low DE starch hydrolysate. The product was produced by concentrating a feed corn syrup of 20 to 40 DE through a cellulose acetate reverse osmosis (RO) membrane until the DE of the retentate has been reduced to from about 5 to about 18.

Those concerned with low DE starch hydrolysates recognize the need for an improved substantially non-retrograding, low DE starch hydrolysate, particularly in liquid form, and blends thereof with other carbohydrates.

BRIEF SUMMARY OF THE INVENTION

The present invention is directed to a process for producing a substantially non-retrograding starch hydrolysate, which involves fractionating a starch hydrolysate comprising a DE greater than about 21 using a nanofiltration membrane, preferably selected from the group consisting of teflon membranes, stainless steel membranes, ceramic membranes, polyamide membranes, and polysulfonated polysulfone membranes; and most preferably selected from the group consisting of polyanide membranes, and polysulfonated polysulfone membranes; and/or having a molecular weight cut-off of less than about 4,000 daltons, under nanofiltration conditions effective to result in low DE starch hydrolysate fraction comprising a DE of less than about 25.

In accordance with the present invention, the nanofiltration membranes are more preferably selected from the group consisting of polyamide membranes and polysulfonated polysulfone membranes wherein such preferred membranes preferably have a molecular weight cut-off within a range of about 400 to about 4,000 daltons, more preferably within a range of about 800 daltons and about 1,500, and most preferably about 1,000 daltons.

In accordance with the present invention, such nanofiltration membranes preferably comprise a thin film composite membrane, wherein the preferred thin film composite membrane is selected from the group consisting of polyamide membranes and polysulfonated polysulfone membranes.

For purposes of the present invention, specific examples of nanofiltration membranes may be selected from the group consisting of ASP40 and ASP50 (manufactured by Advanced Membrane Technology), and GH and GE, (manufactured by Osmonics/Desal).

For purposes of the present invention, effective nanofiltration conditions comprise a pressure less than about 600 pounds per square inch, preferably wherein the pressure is within the range of about 100 psi to about 500 psi; and a temperature less than about 80° C., preferably wherein the temperature is within the range of about 45° C. to about 65° C.

In one embodiment of the present invention, the low DE starch hydrolysate fraction comprises a liquid, substantially non-retrograding, low DE starch hydrolysate fraction comprising a DE of less than about 25. The liquid, substantially non-retrograding, low DE starch hydrolysate fraction preferably comprises a dry solids content is within a range of about 50% to about 85%, and/or a viscosity at 70% dry solids content and at 25° C. of less than about 30,000 centipoise.

The present invention is also directed to a process for producing a substantially non-retrograding and essentially microbial-stable, low DE starch hydrolysate blend, which involves combining the product produced by the process of the present invention, generally described above and in more detail hereinbelow, with a carbohydrate in a predetermined blending ratio to result in a low DE starch hydrolysate blend, preferably wherein the carbohydrate is selected from the group consisting of sugar alcohols, glycerol, propylene glycol, glycerine, inulin, glucose syrup, maltose syrup, and high fructose syrup, and most preferably wherein the carbohydrate comprises high fructose corn syrup comprising about 55% fructose.

The present invention also involves hydrogenating the low DE starch hydrolysate fraction to result in an hydrogenated low DE starch hydrolysate fraction.

It is accordingly an objective of the present invention to provide a nanofiltration membrane process for producing low DE starch hydrolysates and maltodextrin products, particularly in their liquid form which are eventually substantially retrogradation free, and have lower viscosity at high dry solids compared to acid or enzyme converted products.

It is also an objective of the present invention to produce low DE starch hydrolysate-blend products which are substantially retrogradation free, and have very low viscosity.

The products produced by present invention do not have detectable levels of DP200+.

The liquid form and its characteristics of low viscosity are particularly suitable for drying, preferably by spray drying, the liquid to result in a solid or substantially dry product.

BRIEF DESCRIPTION OF THE DRAWING

The Figure shows a flow diagram for a nanofiltration process in accordance with the present invention.

DETAILED DESCRIPTION OF THE INVENTION

Figure 1:
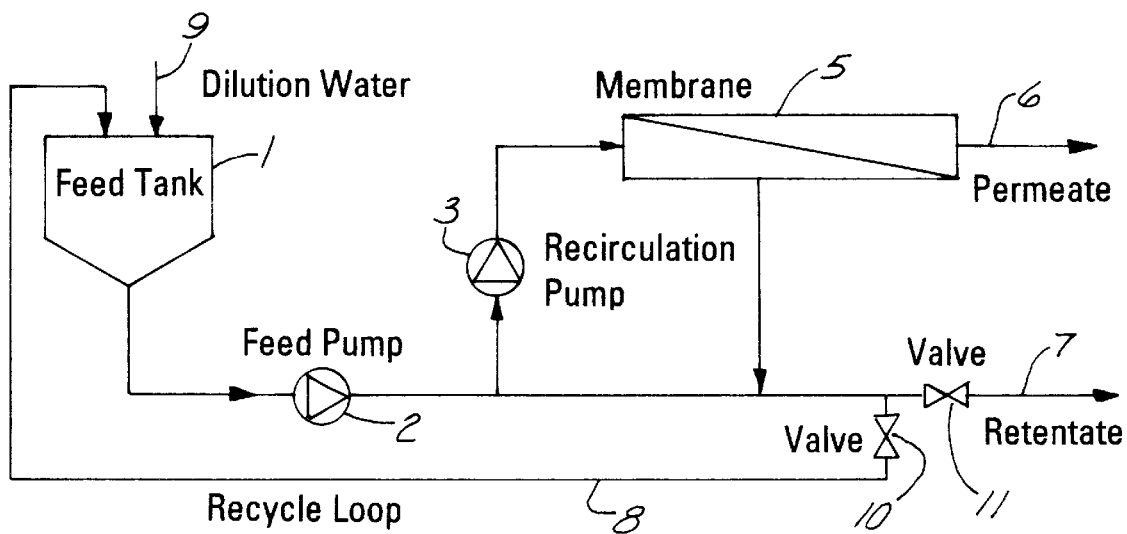

The following is a detailed description of the present invention intended to be claimed:

The products of the present invention are produced by a nanomembrane filtration process shown in FIG. 1.

In general, the process for producing an essentially non-retrograding starch hydrolysate in accordance with the present invention involves fractionating a starch hydrolysate comprising a DE greater than about 21 using a nanofiltration membrane, preferably selected from the group consisting of teflon membranes, stainless steel membranes, ceramic membranes, polyamide membranes, and polysulfonated polysulfone membranes, and/or having a molecular weight cut-off of less than about 4,000 daltons, under nanofiltration conditions effective to result in low DE starch hydrolysate fraction comprising a DE of less than about 25.

The starch hydrolysate comprising a DE greater than about 21 suitable for purposes of the present invention are starch hydrolysates comprising a DE greater than about 21 which are effective in resulting in a low DE starch hydrolysate fraction comprising DE of less than about 25 upon fractionation in accordance with the present invention.

For purposes of the present invention, the nanofiltration membranes are more preferably selected from the group consisting of polyamide membranes and polysulfonated polysulfone membranes preferably having a molecular weight cut-off within a range of about 400 to about 4,000 daltons, more preferably is within a range of about 800 daltons and about 1,500, and most preferably of about 1,000 daltons. Such nanofiltration membranes preferably comprise a thin film composite membrane, wherein a preferred thin film composite membrane is selected from the group consisting of polyamide membranes and polysulfonated polysulfone membranes. Specific examples of nanofiltration membranes include membranes selected from the group consisting of ASP40 and ASP50 (manufactured by Advanced Membrane Technology); and GH and GE, (manufactured by Osmibucs/Desal). The thin film composite membranes may comprise polysulfone as support and polyester as backing. The membrane configuration may be selected from the group consisting of flat sheets, tubes, and spiral wound membranes.

The flux of permeate, defined as gallons per square foot per day, in nanofiltration processes in accordance with the present invention varies with pressure. The higher the pressure, the higher the flux. In accordance with the process of the present invention, the nanofiltration step of the present invention is operated at a pressure preferably of less than about 600 psi, and most preferably within a range of about 100 psi and about 500 psi. In contrast, conventional reverse osmosis processes typically require 500 to 2500 psi operating pressure in order to obtain meaningful flux. In accordance with the present invention, for a permeate flux of a starting material feed of corn syrup having a DE 36 and a 30% dry solids at 50° C. and a pressure of about 480 psi is not less than 12 gallon per square foot per day (GFD).

The permeate flux in nanofiltration process also varies with different temperature. An increase of the operating temperature of about 10° C. can increase the flux by as much as 100%. However, as the operating temperature is increased, there is an increase in the tendency of the membrane rupture. As a result, the nanofiltration step of the processes of the present invention is operated at as high a temperature as possible to obtain maximum permeate flux without damaging membrane materials and structure or degrading the product. Accordingly, the operating temperature of the nanofiltration processes of the present invention is preferably less than about 80° C., more preferably within the range of about 40° C. to about 70° C., and most preferably at about 45° C to about 65° C.

Accordingly, a low DE starch hydrolysate is fractionated using such a nanofiltration membrane under nanofiltration conditions which comprise a pressure less than about 600 pounds per square inch, preferably wherein the pressure is less than about 500 psi; and a temperature less than about 80° C., preferably wherein the temperature is less than about 65° C.

The nanofiltration step of the present invention can be operated as a batch operation or continuous operation. A batch operation can be operated using a closed single nanofiltration membrane element or a plurality of nanofiltration membrane elements in parallel or series, wherein a given starch hydrolysate as starting material feed is fractionated through a suitable nanofiltration membrane at a pressure and a temperature within previously described pressure ranges and temperature ranges, respectively, with retentate being recycled back to the feed tank to reduce a low DE fraction to the required value. In continuous operation, the starch hydrolysate as a starting material feed can be pumped through a series of membrane elements in serial or serial-parallel set-up for fractionation to reduce the low DE fraction to the desired value.

For example, referring to FIG. 1, at the beginning of the process, about 30 gallons of starting material, i.e., acid converted corn syrup at about 30% dry substance, was transferred into the feed tank (1). The acid converted corn syrup starting material preferably has a DE greater than about 21 DE. The starting material as a feed was pumped through a feed pump (2) to a membrane element. A recirculation pump (3) is used to increase cross flow velocity of the liquid. The feed material is subjected to membrane fractionation by permeation of small molecular weight materials such as oligosaccharides lower than DP5 through, a nanofiltration membrane which retains large molecular weight materials. Permeate (6) from the membrane (5) was taken out of the system. The retentate (7) from the membranes (5) was recycled (8) back to the feed tank (1) until the DE of the retentate (7) reached target, preferred lower than DE 18. Since retentate (7) was recycled (8) to the feed tank (1) during batch processing, the dry substance built up. Therefore, dilution water (9) needs to be added in order to maintain high flux of membrane fractionation. In continuous processing, valve (10) is always closed, and there will be no recycle fluid back to the tank.

In one embodiment of the present invention, the low DE starch hydrolysate fraction which is produced comprises a liquid, low DE starch hydrolysate fraction comprising a DE of less than about 25. The liquid, low DE starch hydrolysate fraction preferably comprises a dry solids content within a range of about 50% to about 85%. The liquid, low DE starch hydrolysate preferably has a viscosity at 70% dry solids content and at 25° C. of less than about 30,000 centipoise. For purposes of the present invention, the viscosity at 70% dry solids and at 25° C. is more preferably between about 4,000 cp and 10,000 cp.

The low DE starch hydrolysates and maltodextrins produced in accordance with the present invention have lower viscosity than conventionally acid or enzyme converted material having substantially the same DE. For the same DE product, viscosity increases with a higher concentration of long chain molecular (e.g., oligosaccharides of DP21+). Although not wishing to be bound by any particular theory, the lower viscosity property products produced in accordance with the present invention is attributed to its lower weight concentration of DP2+ which was only about 11% at about 14 DE. This is in contrast to conventionally converted 14 DE maltodextrin which has at least 40% DP21+. In general, a nanofiltration membrane produced maltodextrin of 18 DE and 70% dry substance at room temperature (23° C.) has a viscosity of less than about 8,000 centipoise. While the conventionally enzyme converted maltodextrin of the same DE, same dry substance and at the same temperature has a viscosity of about 20,000 centipoise. (cp). The low viscosity of the starch hydrolysates and maltodextrins produced in accordance with the present invention allows such starch hydrolysates and maltodextrins to be concentrated or evaporated up to about 80% dry solids content, or higher, without any handling difficulty.

A high content of dry substance, e.g., equal or above about 75% results in an additional advantage of the maltodextrins of the present invention which is microbial stability. Water activity of maltodextrins produced in accordance with the present invention of about 75% dry solids is lower than 0.86 at room temperature which is stable enough for shipping in liquid form whereas regular maltodextrin cannot be shipped in liquid form.

The substantially non-retrograding low DE starch hydrolysate product produced in accordance with the present invention preferably has a DE within a range of about 4 to about 20, less than about 6% to about 10% weight concentration of mono- and disaccharides, and less than about 15% to about 20% weight concentration of oligosaccharides with degree of polymerization higher than about 21. Preferably low DE the starch hydrolysate product comprises liquid, low DE starch hydrolysate having a moisture content within a range of about 50% to about 85% and/or a viscosity at 70% dry solids content and at 25 ° C. of less than about 30,000 centipoise, preferably wherein the viscosity is within the range of about 2,000 centipoise to about 15,000 centipoise, and more preferably about 4,000 centipoise to about 10,000 centipoise.

In accordance with the present invention low DE starch hydrolysate products are produced wherein the DE is within a range of about 8 to about 10 up to about 18; the concentration of mono- and di-saccharides is up to about 6%; and the concentration of oligosaccharides having a degree of polymerization higher than about 21 is within the range of up to about 15%.

Low DE starch hydrolysates and maltodextrins produced in accordance with the present invention exhibit liquid solution stability, low viscosity, and remain substantially retrogradation free over extended periods of time, even at high dry solids content, at refrigeration and room temperatures. The low DE starch hydrolysates and maltodextrins of the present invention normally have a DE not substantially above 25 for low DE starch hydrolysates and not substantially above 20 for maltodextrins. The low DE starch hydrolysates and maltodextrins of the present invention preferably have a DE within the range of 4 to 18. Atypical maltodextrin produced in accordance with the present invention generally has a DE within the range of about 8 to about 18.

As used herein, low DE starch hydrolysate means a starch hydrolysate having a DE of not greater than about 25. Maltodextrin is a starch hydrolysate having a DE of not greater than about 20.

The term "dextrose equivalent" (DE), referred to herein, is defined as the reducing value of the maltodextrin or starch hydrolysate, material compared to the reducing value of an equal weight of dextrose, expressed as percent, dry basis, as measured by the School method described in Encyclopedia of Industrial Chemical Analysis, Vol. 11, pp. 41–42.

The terms "non-retrograding", "retrogradation free", and the like are intended to be synonymous with "non-hazing" which is defined as having less than about 0.3 absorbency, and preferably less than about 0.1 absorbency, measured spectrophotometrically at about 600 nm, after storage at room temperature, i.e., about 23° C., for about three (3) months.

As used herein, the terms "stable", "stability", and the like refer to microbial stability.

Although the present invention is disclosed using corn starch hydrolysates, also referred to as "corn syrup", as starting materials, glucose syrup and other starch hydrolysates from other starch sources may be used.

The low DE starch hydrolysates and maltodextrins produced in accordance with the present invention have a narrow saccharide distribution. In general, the amount of monosaccharides and disaccharides is less than about 6% by weight and the amount of oligosaccharides of polymerization higher than about 21 is less than about 15% by weight.

The present invention is also directed to a process for producing a substantially non-retrograding and low DE starch hydrolysate-blend. In a preferred embodiment of the present invention, the low DE starch hydrolysate used in producing the blend comprises liquid, low DE starch hydrolysate. In accordance with this embodiment of the present invention, the process comprises combining the low DE starch hydrolysate product produced by the process of the present invention as described herein with a carbohydrate in a predetermined blending ratio to result in a low DE starch hydrolysate blend. For purposes of this embodiment of the present invention, the carbohydrate is selected from the group consisting of sugar alcohols, propylene glycol, glycerine, inulin, glucose syrup, maltose syrup, and fructose syrup. Preferably the carbohydrate comprises high fructose corn syrup, comprising about 55% fructose.

The substantially non-retrograding and low DE starch hydrolysate-blend produced in accordance with this embodiment of the present invention comprises at least 50% weight concentration of low DE starch hydrolysate and no more than about 50% weight concentration of a member selected from the group consisting of sugar alcohols, propylene glycol, glycerine, inulin, glucose syrup, maltose syrup, and fructose corn syrup.

In accordance with the present invention, the blending ratio of low DE starch hydrolysate to high fructose corn syrup is not less than about 50:50 weight base.

The present invention is also directed to a process for producing a low DE starch hydrolysate-carbohydrate blend wherein the low DE starch hydrolysate comprises a solid, substantially dry low DE starch hydrolysate. In this embodiment, a low DE starch hydrolysate is combined preferably with a member selected from the group consisting of sugar alcohols, propylene glycol, glycerine, inulin, glucose, maltose and fructose, or other saccharides.

Thus, the low DE starch hydrolysates and maltodextrins produced by the nanofiltration membrane fractionation process of the present invention can be mixed, blended or otherwise combined with such carbohydrates at a maximum 50:50 weight blending ratio to obtain a blended product having a lower viscosity and water activity; than a blended product using convention maltodextrins of substantially the same DE.

The high fructose syrup preferred for purposes of this embodiment of the present invention is selected from the group consisting of 42 HFCS and 55 HFCS, with 55 HFCS being most preferred. The blending ratio of low DE starch hydrolysates, such as maltodextrin, in accordance with the present invention, with HFCS is from about 100:0 to about 50:50, wherein about 75:25 is most preferred. The maltodextrin blend is particularly suitable for use in beverage and sports drinks.

In accordance with the present invention blending low DE starch hydrolysates and maltodextrins produced in accordance with the present invention can be accomplished by suitable means such as mixing, e.g., maltodextrin which has been evaporated to a dry substance content of about 70%, with finished HFCS product having a dry substance content of about 70% in a mixing tank. Blending can also be accomplished by continuous online mixing or other suitable means as are conventionally used for such purpose.

The process of the present invention also involves drying the liquid, low DE starch hydrolysate fraction to a moisture content of less than about 10%, preferably wherein the drying comprises spray drying, to result in a solid, substantially dry product.

Drying means which may be used for purposes of dehydrating the liquid low DE starch hydrolysate in accordance with the present invention include conventional dehydration apparatus and methods suitable for dehydrating liquids having characteristics, such as viscosities, similar to those of the low DE starch hydrolysates.

The process of the present invention also involves hydrogenating the low DE starch hydrolysate fraction comprising a DE of less than about 25 to result in a hydrogenated low DE starch hydrolysate, preferably wherein the hydrogenated low DE starch hydrolysate comprises liquid hydrogenated low DE starch hydrolysate or wherein the hydrogenated low DE starch hydrolysate comprises solid hydrogenated low DE starch hydrolysate.

The present invention is also directed to a process for co-hydrogenation of a low DE starch hydrolysate-saccharide blend. In this embodiment, the process of the present invention comprises blending a low DE starch hydrolysate produced by nanofiltration in accordance with another saccharide to form a low DE starch hydrolysate-saccharide blend; and hydrogenating the low DE starch hydrolysate-saccharide blend to result in an hydrogenated low DE starch hydrolysate-saccharide blend.

To obtain the corresponding products, i.e., low DE starch hydrolysates and blends described above, they may be subjected to conventional hydrogenation. For example, the low DE starch hydrolysate fraction resulting from nanofiltration fractionation may be subjected to the Raney nickel method of hydrogenation under suitable conditions therefor.

For purposes of the present invention, the other saccharides comprise a member selected from the group consisting of non-glucose saccharides, preferably wherein the non-glucose saccharides are preferably selected from the group consisting of lactose, erythrose, xylose, and isomaltose.

Thus, the present invention is also directed to a blend comprising hydrogenated low DE starch hydrolysate and a carbohydrate preferably selected from the group consisting of sugar alcohols, propylene glycol, glycerine, inulin, glucose, maltose and fructose, wherein the carbohydrate may be in liquid form, for example, solutions and syrups, or wherein the carbohydrate may be substantially dry.

Referring now to FIG. 1, in accordance with the process of the present invention, a conventionally acid converted corn starch hydrolysate, also referred to herein as "syrup" and "corn syrup", with a DE within the range of about 25 DE to 75 DE, and preferably within a range of about 28 DE to 50 DE, is fed into a nanofiltration membrane, as shown in FIG. 1, for fractionation. The permeate from the membrane is taken out of the system, and the retentate is recycled to the feed tank for further concentration. Once the DE value of retentate reaches a target level, which is preferably a DE 4–20, and more preferably is a DE 8–18, valve (11) in FIG. 1 is opened and valve (10) is closed. The retentate is sent forward into a storage tank as product. Operating pressures and temperatures are important process parameters. For purposes of the present invention, the operating pressure of the system is controlled to below about 600 psi, and preferably below about 500 psi. For purposes of the present invention, the operating temperature of the system is controlled to below about 65 ° C., and more preferably below about 60° C. The pH level of material being processed in accordance with the present invention is also important. For purposes of the present invention, a pH between about 2 to about 10 is preferred; and a PH between about 3 to about 8 is more preferred.

More specifically, in the process of the present invention, an acid converted starting material, such as corn starch hydrolysates (syrup) with a DE within a range of about 28 DE to 63 DE, but preferably within a preferred range of about 28 DE to 43 DE, is pumped through a nanofiltration membrane for fractionation at a trans-membrane pressure less than 500 psi, permeate is removed from of the system and retentate is recycled to the feed until the DE of the syrup has been reduced to a desired level which is about 4 to 20, and preferably about 8 to 18.

For purposes of the present invention, the DE of the starch hydrolysate starting material is not less than about 21, preferably within a range of about 21 to about 80, more preferably within a range of about 25 to about 63, and most preferably is within the range of about 25 to about 42.

For purposes of the present invention, the starch hydrolysate comprises a member selected from the group consisting of corn starch hydrolysate, wheat starch hydrolysate, root starch hydrolysate, and waxy maize starch hydrolysate, and the like most preferably wherein the starch hydrolysate comprises corn syrup. The raw material used may be its corresponding modified or unmodified form, although starches from any starch may be used.

For purposes of the present invention, the starch hydrolysate comprising a DE of not less than about 21 DE is made by a conversion procedure selected from the group consisting of one-step conversion and multi-step conversion, preferably wherein the conversion procedure is selected from the group consisting of acid conversion, enzyme conversion, and mixed-conversion of both acid and enzyme, and most preferably comprises acid conversion.

The low DE starch hydrolysates, such as maltodextrins, of the present invention, whether in the form of syrups or dry powder, are particularly suitable for use in food and beverage products. The maltodextrins are especially useful in stable, low DE syrups.

The characteristics of low DE starch hydrolysates, such as maltodextrins produced in accordance with the present invention make the products of the invention particularly suitable for applications as carriers for coloring agents, flavors, fragrances and essences, and synthetic sweeteners; spray drying adjuncts for coffee extracts and tea extracts; bulking, bodying and dispersing agents in synthetic creams or coffee whiteners; ingredients promoting a moisture retention in bread, pastry and meats; components of dry soup mixes, bakery mixes, frosting mixes, spice mixes and blends, coverage powders, condiments, gravy mixes, sauce mixes and frozen dairy foods; and in fat mimetics. In addition, they are useful in the formulation of tabulating compounds which can be used in food products or pharmaceutical products, anti-caking agents, whipped products, protective coatings, agglomeration aids, low or reduced-in-calorie foods and beverages.

EXAMPLES

The present invention will now be described in further detail by means of the following representative examples.

Example 1

An acid converted corn syrup having a DE of about 42 and dry solid content of about 23.7% is pumped through a nanofiltration membrane for fractionation using a single pass nanofiltration process. The retentate is recycled to the feed tank until the DE has been reduced to DE 14.5. A thin film composite nanofiltration membrane, ASP 40, made by Advanced Membrane Technology, Inc., San Diego, Calif., is used for test runs. ASP 40 membrane has the following characteristics:

Membrane material: Thin film composite of sulfonated polysulfone on polysulfone, with a non-woven polyester backing Configuration: Spiral wound Surface area: about 5.3 m^2 (4 inch diameter and 40 inch length)

Operating pressure: Up to about 600 psi

Operating temperature: Up to about 60° C.

Operating pH range: about 2–11

Maximum chlorine: about 200 ppm

Rejection specification: NaCl=30–40%, Lactose=45–65%

The conversion process was terminated when the DE value of converted corn starch material reached about 42. The resultant 42 DE, acid converted corn starch material was clarified using a centrifuge to remove residual oil and protein. Following this, a carbon treatment and ion exchange refining process were conducted to de-color and de-ash the material. Finally, the material was evaporated to a dry substance content of about 70%.

Fifteen gallons of acid converted corn syrup having a DE 42 was fed into the feed tank, e.g., as shown in FIG. 1, and diluted to a dry substance content of about 23.7%. The processing line was a single stage system having one nanofiltration membrane element having a 4 inch diameter. The fractionation process was conducted as a batch concentration operation. The permeate was removed from the system, and the retentate was recycled back to the feed tank. The DE value was monitored periodically. Retentate recycle was terminated when the DE value of the retentate reached about DE 15. The retentate was then sent forward and collected in a storage container as product. The collected product had collected volume of 13 gallons, and a dry substance content of about 50.5%.

The processing line is operated at a pressure of about 475 psi and a temperature of about 50° C. The permeate flux is 20.3 GFD at the beginning and 1.5 GFD at the end of fractionating. The resultant maltodextrin is substantially free of retrogradation, has the following carbohydrate profile:

| DE | 14.5 |
|---|---|
| Fructose | 0.048 |
| Dextrose | 0.760 |
| DP2 | 1.517 |
| DP3 | 3.557 |
| DP4 | 6.627 |
| DP5 | 8.359 |
| DP6 | 8.442 |
| DP7 | 7.960 |
| DP8 | 7.375 |
| DP9 | 6.759 |
| DP10 | 5.835 |
| DP11–21 | 32.226 |
| DP21+ | 10.534 |

The above-described maltodextrin is further evaporated using a lab rotary vacuum evaporator to different dry solids. The ranges of the variables are: a solids content within the range of about 65% to 75%, storage temperature within the temperature range of about 7° C. to about 49° C.; up to about 0 to 0.15% of sorbic acid, and a pH within a pH range of about 2.8 to about 3.5. Color, haze (represented by absorbency at 600 nm) direct count of bacteria, yeasts, and molds were tested at the beginning and after each month of the storage. After 4 months of storage, all 28 tested samples are still clear and retrogradation free.

The viscosity of the resultant maltodextrin in accordance with the present invention is 65,500 cp at 75.3% dry solids and 7450 cp at 70% dry solids, which is lower than conventionally converted maltodextrin as listed in Table 3 in example 6.

Example 2

In this example, a 36 DE acid converted corn syrup was used as starting material. This starting material was produced by the same process as in Example 1 except that the conversion terminated when the DE value of the acid converted corn syrup material reached about DE 36 and the converted material was not fully ion exchange refined.

The same processing system and nanofiltration membrane as in Example 1 were used to produce the sample in this example. Thirty gallons of 36 DE corn syrup at a dry substance content of about 80% was fed into the feed tank, e.g., as shown in FIG. 1, and diluted to a dry substance content of about 32.6%. The fractionation process was conducted as a batch operation. The permeate was taken out of the processing system, and retentate was recycled back to the feed tank. The DE value was monitored periodically. Retentate recycle was terminated when the DE value of the retentate reached about DE 18. The retentate was then sent forward and collected in a storage container as product. The collected product had a collected total volume of about 23 gallons and a dry substance content of about 51.3%.

The operating conditions included a pressure of about 480 psi and a temperature of about 50° C. The permeate flux was 8.2 GFD at the beginning and 1.5 FGD at the end of concentration. The resultant maltodextrin had a DE of 17.2 and the following carbohydrate profile:

| DE | 17.2 |
|---|---|
| Fructose | 0.147 |
| Dextrose | 1.996 |
| DP2 | 3.038 |
| DP3 | 5.803 |
| DP4 | 6.884 |
| DP5 | 9.032 |
| DP6 | 10.626 |
| DP7 | 7.789 |
| DP8 | 5.272 |
| DP9 | 4.218 |
| DP10 | 4.059 |
| DP11–21 | 31.794 |
| DP21+ | 9.342 |

The collected maltodextrin product is further evaporated using a laboratory rotary vacuum evaporator to a dry solids content of 70.2% and 75.5%.

The samples of each of these dry solids contents were stored at room temperature for 2 months and analyzed. Both are clear and retrogradation free.

Example 3

An acid converted corn syrup having a D.E. of about 42 and dry solids of 43.5% is pumped through a nanofiltration membrane for fractionation using a single pass nanofiltration pilot plant as shown in the figure. The retentate is recycled to the feed tank until the DE has been reduced to 14.9. The pilot plant used for producing sample products is made by Niro, Inc., Hudson, Wis. A thin film composite polyamide membrane, GH, is used for the test runs and made by Desalination System, Inc., Vista, Calif. GH membrane has the following characteristics:

Membrane material: Thin film composite polyamide

Configuration: Spiral wound

Surface area: About 5.3 m^2 (4 inch diameter and 40 inch length)

Operating pressure: Up to 600 psi

Operating temperature: Up to 50° C.

Operating pH range: 2–11

Maximum chlorine: 20–50 ppm day

Rejection specification: 50% MgSO4 at 150 psi, and 25 degree C.

The acid converted 42 DE corn syrup feed material in this example was from corn starch. Corn starch having a dry substance within the range of about 34 to 40% was hydrolyzed using hydrochloric acid at a pH 1.8 and at a temperature of about 128° C. The conversion process was terminated when the DE value of converted corn syrup material reached about 42. The resultant 42 DE, acid converted corn syrup material was clarified using a centrifuge to remove residual oil and protein. Following this, a carbon treatment and ion exchange refining processes were conducted to de-color and de-ash the material. Finally, the material was evaporated to a dry substance content of about 80%.

10 gallons of acid converted corn syrup having a DE 42 was fed into the feed tank, e.g., as shown in FIG. 1, and diluted to a dry substance content of about 43.5%. The process was a single stage system with one nanofiltration membrane element having a 4 inch diameter. The fractionation process was conducted as a batch concentration operation. The permeate was removed from the system, and the retentate was recycled back to the feed tank. Dilution water was periodically added into the feed tank to maintain material dry substance content below about 50%. The retentate recycle was terminated when the DE value of the retentate reached about 15. The collected product had volume of 8 gallons and a dry substance content of about 52.55%.

The process is operated at 485 psi and 50° C. The permeate flux is 8.43 GFD at the beginning and 1.66 GFD at the end of fractionating concentration which has 52.55% dry solids. The resulted maltodextrin is retrogradation free, low viscosity and has the following carbohydrate profile:

| | |
|---|---|
| DE | 14.9 |
| Fructose | 0.021 |
| Dextrose | 0.616 |
| DP2 | 1.185 |
| DP3 | 3.649 |
| DP4 | 7.623 |
| DP5 | 10.302 |
| DP6 | 10.011 |
| DP7 | 6.839 |
| DP8 | 7.762 |
| DP9 | 6.679 |
| DP10 | 5.695 |
| DP11–21 | 31.900 |
| DP21+ | 7.719 |

The above maltodextrin is further evaporated using a lab rotary vacuum evaporator to 70% dry solids for storage stability tests. Two samples, one with no pH adjustment (about pH=4.5), one with pH adjusted to 3.0 using 7% HCl, were prepared for storage tests. After 4 months storage at room temperature conditions, both samples were still as clear as the original. There was no microbial growth either.

The viscosity of the maltodextrin of this example is 7116 cp at 70% dry substance and at room temperature.

Example 4

Starting material for nanofiltration membrane fractionation in this example was a 36 DE acid converted corn syrup made by hydrolyzing corn starch at a dry substance content within the range of about 34–40% using hydrochloric acid at pH 1.7 and at a temperature of about 128° C. The conversion process was terminated when the DE value of the converted material reached about DE 36. The acid converted corn starch material was clarified using a centrifuge to remove residual oil and protein. Following this, an ion exchange refining process was conducted to remove color and odor. Part of carbon treated material was ion exchange refined. The resultant material was a mixture of two streams which are ion exchange refined and non-ion exchange refined. This resultant material was evaporated to a dry substance content of about 80%.

The same processing system and nanofiltration membrane, e.g., as shown in Example 1, were used to produce the sample in this example. Thirty gallons of 36 DE corn syrup at a dry substance content of about 80% was fed into the feed tank, e.g., as shown in FIG. 1, and diluted to a dry substance content of about 32.6%. The fractionation process was conducted as a batch concentration operation. The permeate was removed from the system, and retentate was recycled back to the feed tank. The DE value was monitored periodically. Retentate recycle was terminated when the DE value of the retentate reached about DE 18. The retentate was then sent forward and collected in a storage container as product. The collected product had a collected total volume of about 23 gallons and dry substance content of about 51.3%. The operating conditions are the same as in Example 2.

The maltodextrin from nanofiltration membrane fractionation obtained by this example is evaporated to three different dry substance levels, or contents of about 65%, 70% and 75%. A commercially available 55 high fructose corn syrup (HFCS) from Roquette America, Inc, at a dry substance content of about 77% is diluted to produce three samples comprising a dry substance content of about 65%, 70% and 75%, respectively. The resultant maltodextrins and 55 HFCS are blended in beakers by stirring and mixing in blending ratios of about 75:25 and about 50:50 of maltodextrin to 55 HFCS. About 70 ml of each sample is transferred into 4 ounce polypropylene specimen container (made by Cole Parmer) for storage test and analysis.

The maltodextrin of this example is blended with a 55 HFCS corn syrup at different dry solid contents and different blending ratios. The improvement of the viscosity and water activity is shown in Tables 1 and 2. All samples are stored at room temperature (about 23° C.), without preservative addition and pH adjustment, for retrogradation and microbial stability tests.

The samples have been stored for more than six months, and upon analysis none of the samples has been observed to exhibit hazing or microbial growth.

TABLE 1

Viscosity (cp) at 25° C. of blended maltodextrin

| Product | 65% DS | 70% DS | 75% DS |
|---|---|---|---|
| Maltodextrin (Example 2) | 1560 | 6930 | 79500 |
| 55 HFCS | 55 | 139 | 447 |
| Maltodextrin/55 HFCS at 75/25 weight blend | 499 | 1927 | 9000 |
| Maltodextrin/55 HFCS at 50/50 weight blend | 215 | 615 | 2600 |

TABLE 2

Water activity at 23° C. of maltodextrin-blend

| Product | 65% DS | 70% DS | 75% DS |
|---|---|---|---|
| Maltodextrin (Example 2) | 0.92 | 0.90 | 0.85 |
| 55 HFCS | 0.79 | 0.75 | 0.69 |
| Maltodextrin/55 HFCS at 75/25 weight blend | 0.89 | 0.85 | 0.78 |
| Maltodextrin/55 HFCS at 50/50 weight blend | 0.85 | 0.81 | 0.75 |

Example 5

Thirty gallons of acid converted 42 DE corn syrup were fed into a single stage nanofiltration membrane processing system, e.g., as shown in FIG. 1, (NIRO Hudson, Wis.) with a 4 inch spiral nanomembrane (ASP40 from Advanced Membrane Technology, CA. Thirteen gallons of clear liquid retentate having a DE of 13.5 were obtained. The process was performed at 500 psi and 45° C. The membrane used was made from a polysulfonated polysulfone with about 1000 Dalton molecular weight cut off. During the process, permeate flow was removed from the system and the retentate flow was recycled to the feed tank. The test continued until the retentate DE reached about DE 14. The dry substance content of resultant product was about 50% and was further evaporated to a dry solids content of about 70% using a lab scale rotary vacuum evaporator. The resulted product was analyzed using a Brookfield viscometer and HPLC. The viscosity of the analyzed product is only less than about half of the viscosity of conventionally produced material having a similar DE, and the carbohydrate profile was unique in that it had only 2.2% mono- and di-saccharides and 11.6% oligosaccharides with D.P.>21. The analyzed product at 71% dry substance was stored at room condition and remained clear for more than four (4) months.

Example 6

The advantage of the viscosity of the present invention over conventionally enzyme converted maltodextrins is shown in Table 3. In this example, samples produced in Examples 1, 2, and 3 are analyzed and compared with Glucidex 19 enzymes converted maltodextrin, commercially available from ROQUETTE FRERES, as to viscosity.

TABLE 3

Viscosity (cp) at 25° C. of the maltodextrins

| Product | DE | 65% DS | 70% DS | 75% DS |
|---|---|---|---|---|
| The present invention with 42 DE feed (example 1) | 14.5 | 1650 | 7450 | 65500 |
| The present invention with 36 DE feed (example 2) | 17.2 | 1560 | 6930 | 7950 |
| The present invention with 42 DE feed (example 3) | 14.9 | | 7115 | |
| Conventional enzyme converted maltodextrin (Glucidex 19, commericially produced by Roquette Freres) | 18.0 | 5240 | 18900 | 345000 |

Although not wishing to be bound by any particular theory, it is believed that the advantage of the viscosity of the present invention over conventionally enzyme converted maltodextrins was due to narrow carbohydrate profile distribution.

Example 7

Related to Example 6, the carbohydrate profile of the present invention, exemplified in Examples 1, 2, and 3, has less DP1 and DP2 as well as DP21+, as shown in Table 5.

Again in this example, samples produced in Examples 1, 2 and 3 are analyzed and compared with Glucidex 19, as in Example 6, in addition to another commercially available enzyme converted maltodextrin, i.e., M180, manufactured by Grain Processing Co., to determine respective carbohydrate profiles shown in Table 4.

TABLE 4

Carbohydrate Profile of the maltodextrins

| | Present invention (example 1) | Present invention (example 2) | Present invention (example 3) | Glucidex (Roquette Freres) | M180 (Grain Processing Co.) |
|---|---|---|---|---|---|
| DE | 14.5 | 17.2 | 14.9 | 17.5 | 19.4 |
| DP1% | 0.808 | 2.120 | 0.64 | 1.81 | 2.21 |
| DP2% | 1.517 | 3.038 | 1.18 | 5.95 | 7.02 |
| DP3% | 3.557 | 5.803 | 3.65 | 8.27 | 9.20 |
| DP4% | 6.627 | 6.884 | 7.62 | 6.78 | 7.57 |
| DP5% | 8.359 | 9.032 | 10.30 | 7.14 | 7.25 |
| DP6% | 8.442 | 10.626 | 10.00 | 7.74 | 11.66 |
| DP7% | 7.960 | 7.789 | 6.80 | 5.80 | 8.49 |
| DP8–21% | 52.195 | 45.343 | 52.00 | 23.08 | 17.50 |
| DP21+ | 10.534 | 9.434 | 7.70 | 33.44 | 29.10 |

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

In the claims, means-plus-function clauses are intended to cover the structures described herein as performing the recited function and not only structural equivalents but also equivalent structures.

What is claimed is:

1. A process for producing a substantially non-retrograding starch hydrolysate, said process comprising fractionating a starch hydrolysate comprising a DE greater than about 21 using a nanofiltration membrane selected from the group consisting of teflon membranes, stainless steel membranes, ceramic membranes, polyamide membranes, and polysulfonated polysulfone membranes having a molecular weight cut-off of less than about 4,000 daltons under nanofiltration conditions effective to result in a low DE starch hydrolysate fraction comprising a DE of less than about 25.

2. The process of claim 1, wherein said nanofiltration membrane is selected from the group consisting of polyamide membranes and polysulfonated polysulfone membranes having a molecular weight cut-off within a range of about 400 daltons to about 4,000 daltons.

3. The process of claim 2, wherein said molecular weight cut-off of said nanofiltration membrane is within a range of about 800 daltons to about 1,500.

4. The process of claim 1, wherein said nanofiltration conditions comprise a pressure less than about 600 psi.

5. The process of claim 1, wherein said nanofiltration conditions comprise a temperature less than about 80° C.

6. The process of claim 1, wherein said low DE starch hydrolysate fraction comprises a liquid, essentially microbial stable, low DE starch hydrolysate fraction comprising a DE of less than about 25.

7. A product comprising said low DE starch hydrolysate fraction comprising a DE of less than about 25 produced by the process of claim 1, and beverage ingredients.

8. A product comprising said low DE starch hydrolysate fraction comprising a DE of less than about 25 produced by the process of claim 1, and food ingredients.

9. The process of claim 1, comprising drying said low DE starch hydrolysate fraction to a moisture content of less than about 10% to result in a solid, substantially dry, low DE starch hydrolysate.

10. A hydrogenated low DE starch hydrolysate produced by the process of claim 9.

11. The process of claim 1, comprising hydrogenating said low DE starch hydrolysate fraction to result in a hydrogenated low DE starch hydrolysate.

12. A process for producing a substantially non-retrograding, low DE starch hydrolysate-blend, said process comprising combining the product produced by the process of claim 1 with a carbohydrate in a predetermined blending ratio to result in a low DE starch hydrolysate-blend.

13. The process of claim 12, wherein said carbohydrate is selected from the group consisting of sugar alcohols, propylene glycol, glycerine, inulin, glucose syrup, maltose syrup and fructose syrup.

14. A substantially non-retrograding, low DE starch hydrolysate product comprising a low DE starch hydrolysate having a DE within a range of about 4 to about 20 and having less than about 10% weight concentration of mono- and di-saccharides and less than about 20% weight concentration of oligosaccharides with degree of polymerization higher than about 21.

15. The product of claim 14, wherein said DE is within a range of about 8 to about 18; said concentration of mono- and di-saccharides is less than about 6%; and said concentration of oligosaccharides having a degree of polymerization higher than about 21 is within the range of about 0% to about 15%.

16. The product of claim 14, wherein said low DE starch hydrolysate comprises liquid, low DE starch hydrolysate.

17. The product of claim 16, wherein said low DE starch hydrolysate comprises a dry solids content within a range of about 50% to about 85%.

18. The product of claim 16, wherein said liquid low DE starch hydrolysate comprises a viscosity at 70% dry solids content and at 25° C. of less than about 30,000 centipoise.

19. The product of claim 18, wherein said viscosity is within the range of about 2,000 centipoise to about 15,000 centipoise.

20. A substantially non-retrograding, low DE starch hydrolysate-blend having at least 50% weight concentration of low DE starch hydrolysate produced by the process of claim 1, and no more than about 50% weight concentration of a member selected from the group consisting of sugar alcohols, glycerol, propylene glycol, inulin, glucose syrup, maltose syrup and fructose syrup.

* * * * *